United States Patent [19]

Haraguchi et al.

[11] 4,195,413
[45] Apr. 1, 1980

[54] DEVICE FOR MEASURING DEPTH OF TIRE TREAD GROOVE IN A TIRE

[75] Inventors: Yoshifumi Haraguchi, Kunitachi; Hiroshi Fukuyama, Higashimurayama; Shu Kamiguchi, Kodaira, all of Japan

[73] Assignee: Bridgestone Tire Company Limited, Tokyo, Japan

[21] Appl. No.: 971,153

[22] Filed: Dec. 20, 1978

[30] Foreign Application Priority Data

Jan. 24, 1978 [JP] Japan .................................. 53-6539

[51] Int. Cl.² .............................................. G01B 7/26
[52] U.S. Cl. .................... 33/169 B; 33/172 E
[58] Field of Search ................. 33/169 B, 166, 172 E, 33/174 L, 203, 203.11, 143 L, 143 M, 147 N, DIG. 5; 73/104

[56] References Cited

U.S. PATENT DOCUMENTS

| | | | |
|---|---|---|---|
| 3,058,225 | 10/1962 | Ward | 33/169 B |
| 3,840,994 | 10/1974 | Izumi et al. | 33/174 L |
| 3,895,446 | 7/1975 | Orlov et al. | 33/174 L |
| 3,987,670 | 10/1976 | Tuzzeo et al. | 73/104 |

FOREIGN PATENT DOCUMENTS 1126634  11/1956  France .................. 33/169 B

*Primary Examiner*—Willis Little
*Attorney, Agent, or Firm*—Sughrue, Rothwell, Mion, Zinn and Macpeak

[57] ABSTRACT

A device for measuring a depth of a tread groove in a tire comprises a sensor for measuring the depth of the tread groove as an electrical analogue quantity, an analogue-digital converter for converting the analogue quantity into a digital quantity, a calculation and control section for storing the digital quantities and making a given calculation in accordance with a command from exterior, and an indication section for indicating a calculated result.

11 Claims, 8 Drawing Figures

| | | |
|---|---|---|
| 61-51 | * | Body Number |
| 3 | ◊ | Tire Location Number |
| 04 | # | Measuring Number |
| 7.2т | | |
| 6.9т | | Measured Values |
| 6.9т | | |
| 7.1т | | |
| 7.0м | | Mean Value |

DEVICE FOR MEASURING DEPTH OF TIRE TREAD GROOVE IN A TIRE

This invention relates to a device for measuring a depth of a tread groove formed in a tread portion of a tire.

In general, various performances are required for the tire and among them, a wearing performance or wear life is basically important in the tire. In order to estimate the wearing performance of the tire, it is indispensable to measure a wearing loss of a tread portion of a tire after the tire is mounted on a vehicle and run on a road in practice.

Heretofore, the measurement of the wearing loss has been usually carried out by inspecting a depth of a tread groove with a small vernier calipers. Then, the value indicated by the calipers is visually read and recorded on a paper with a writing member. When the groove depth is measured at a point with respect to a tire, a measuring accuracy is low, so that the measurement is usually carried out at, for example, two points per one tread groove in the circumferential direction of the tire. In case of a tire having four grooves, therefore, it is necessary to measure the groove depth at eight points in total and hence a significant time is required because the measurement of the groove depth per one tire takes about 5 minutes at present. As a result, in case of a truck provided with ten tires, the measurement takes 50 minutes and if it is intended to measure the groove depth on ten trucks, about 8 hours is required and hence a great amount of labor is necessary. Furthermore, when the measurement is made on the tread groove of the inside tire in the dual tires mounted on each side of a rear shaft of such a truck, it is necessary to get under the truck body, so that the workability becomes poor.

Moreover, the measuring accuracy is usually required up to 1/10 mm. However, it is impossible to obtain a satisfactory accuracy according to the prior art using the calipers. Particularly, there is the possibility of causing a human error when visually reading a scale of the calipers or writing a read value on a paper. Such a human error is unavoidable in experts measuring the depth of the tread groove with respect to a great number of tires everyday.

When the depth of the tread groove is measured at some points per one tire as described above, only the recording of these measured values as they are is not quite useful. Therefore, it is necessary, for example, to calculate an arithmetic mean value from the measured values and indicate the mean value as a remaining amount of the tread groove. For this end, the labor and time are not only required for such a calculation, but also a miscalculation may be caused.

It is, therefore, an object of the invention to eliminate the above mentioned drawbacks of the prior art and to provide a device for measuring depth of a tread groove in a tire in which the working time is considerably shortened to about a tenth of the prior art and at the same time an exact measurement can be performed at an accuracy of 1/10 mm without causing the human error.

According to the invention, the device for measuring the depth of the tread groove in the tire comprises a sensor for measuring the depth of the tread groove as an electrical analogue quantity, which has an element for converting a mechanical displacement into an electrical analogue quantity, an analogue-digital converter (A-D converter) for converting the analogue quantity from the sensor into a digital quantity, a calculation and control section for storing a plurality of the converted digital quantities and making a given calculation against the stored digital quantities in accordance with a command from exterior to give an information relating to the depth of the tread groove, and an indication section for indicating a result calculated at the calculation and control section.

The invention will now be described in greater detail with reference to the accompanying drawings, wherein.

Figure 1:
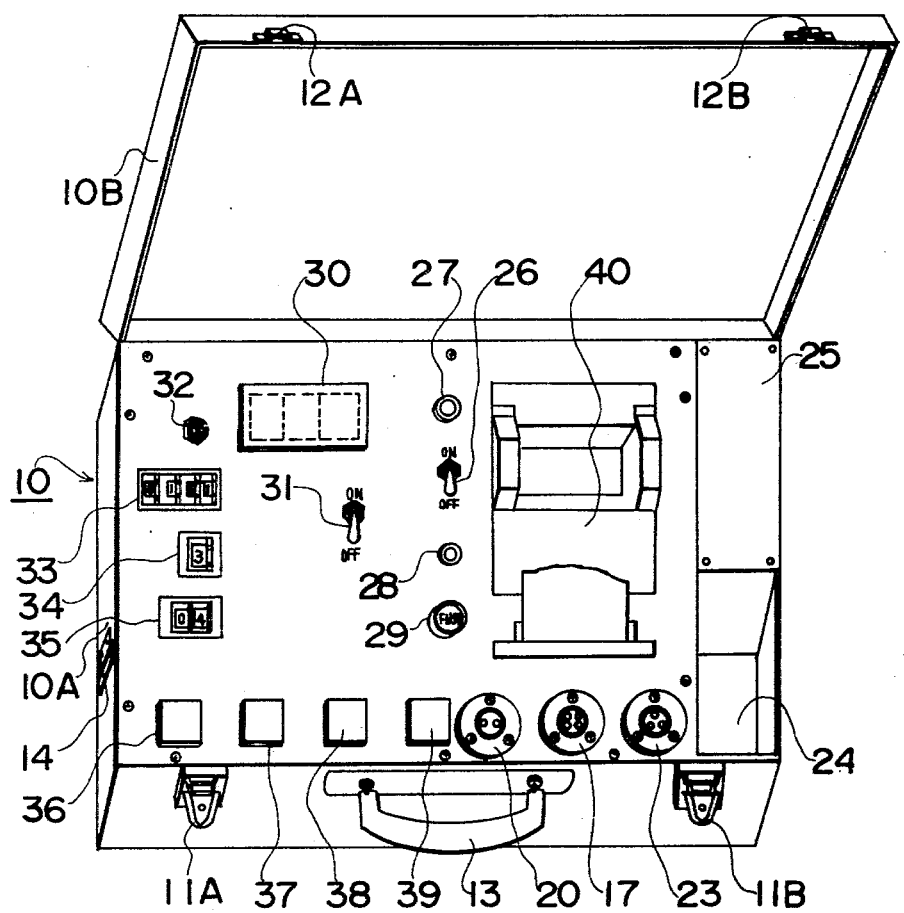
FIG. 1 is a perspective view of an embodiment of the device for measuring a depth of a tread groove in a tire according to the invention.

In FIG. 1 is shown an external appearance of an embodiment of the device for measuring a depth of a tread groove in a tire according to the invention. Such a measuring device is housed in a casing 10 as a whole for carrying with hand. The casing 10 is composed of a case body 10A and a lid 10B hinged therewith like ordinary casings, wherein the case body and lid are locked with each other through latch members 11A, 11B and 12A, 12B. Moreover, a grip 13 is mounted on a front part of the case body 10A for carrying with hand and also two hook members 14 for a shoulder belt (not shown) are mounted on both side parts thereof.

In the inside of the case body 10A are assembled a measuring circuit, a display section, a printer, digital switches for presetting necessary data manually, operational buttons, a battery for power supply and the like and is formed a space for housing a sensor, a remote control switch cord, a power supply cord and the like.

A sensor shown in a right-hand side of FIG. 1 has an element for converting a mechanical displacement into an electrical analogue signal, which is composed of a variable resistor (or potentiometer) in this embodiment. The detail of the sensor 15 will be described below. A cord extending from the sensor 15 has a plug 16 at its end, which may be connected to a receptacle 17.

In FIG. 1 is further shown a remote control switch 18. On a top end of the remote control switch 18 is provided a pushbutton 18a. A cord extending from the remote control switch 18 has a plug 19 at its end, which may be connected to a receptacle 20. And also, a cord extending from a power supply socket 21 has a plug 22 at its end, which may be connected to a receptacle 23. The sensor 15, remote control switch 18 and power supply socket 21 may be housed in a space 24 formed in the case body 10A.

In the case body 10A is further formed a housing part 25 for power supply battery. Furthermore, the case body 10A has a power supply switch 26, an ON-OFF display lamp 27 for power supply, a display lamp 28 for indicating a charged state, a safety fuse 29, a display section 30, an ON-OFF switch 31 for the display section, a knob 32 for correction of measuring value, a four-position digital switch 33 for presetting a body number of a vehicle to be measured, a one-position digital switch 34 for presetting a location of a tire to be measured in the vehicle, a two-position digital switch 35 for presetting the number of points to be measured in one tire or the measuring number, a start pushbutton 36, a cancel pushbutton 37, a measuring pushbutton 38, a paper feed pushbutton 39 and a printer 40 indicating the measured and calculated results.

Figure 2:
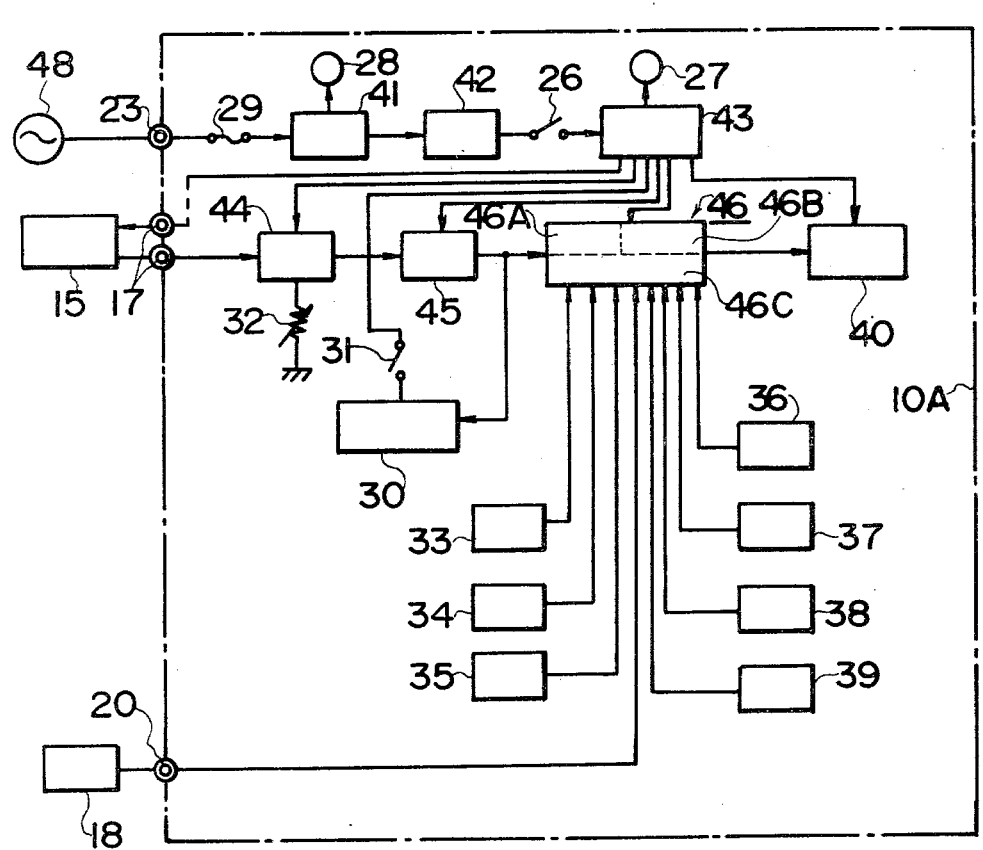
FIG. 2 is a block schematic diagram showing a functional construction of the device of FIG. 1.

In FIG. 2 is shown a block diagram illustrating a functional construction of the device according to the invention. The parts installed in the case body 10A are indicated in an area of a dot-dash-line of FIG. 2. Further, there are a rectifying and voltage-regulating circuit 41, a battery 42, a power circuit 43, an amplifier 44, an A-D converter 45 and a calculation and control section 46, which are not shown in FIG. 1.

In the measuring device of this embodiment, each part is supplied by the battery 42. That is, when an alternating current source 48 is connected to the measuring device through the power supply socket 21, plug 22 and receptacle 23, the battery 42 is charged to a given voltage through the rectifying and voltage-regulating circuit 41. In this case, the display lamp 28 for indicating the charged state does not light in the normal charged state but lights to give warning in the abnormal charged state. Next, when the power supply switch 26 is turned on to close across the battery 42 and the power circuit 43, a predetermined voltage is applied to each part through the power circuit 43. Such a feeding state is indicated by the lighting of the display lamp 27 for power supply.

Figure 3A:
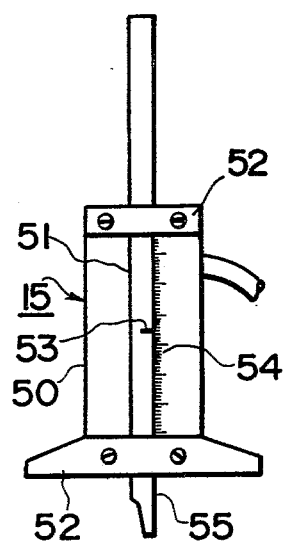
FIGS. 3a and 3b are front and side views of an embodiment of the sensor used in the invention, respectively.
Figure 3B:
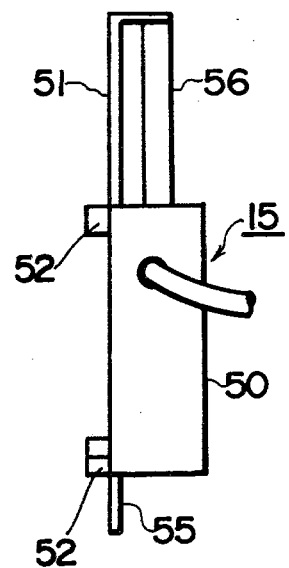

In FIGS. 3a and 3b is shown an embodiment of the structure of the sensor 15 as front and side views. The sensor 15 is constructed as follows. That is, base members 52, 52 are secured to upper and lower ends at front side of a casing 50 so as to slidably guide a scale 51 in the casing 50. In the scale 51 is engraved a standard mark 53, while a calibration 54 is formed in the front surface of the casing 50 along the scale 51. A top 55 of the scale 51 is widthwisely narrowed to form a taper. A slide bar 56 is arranged parallel to the scale 51 and the upper ends of both two members are connected with each other so as to slidably move them in the casing 50. In the casing 50 is arranged a variable resistor, a contact piece of which being connected to the slide bar 56.

Figure 4:
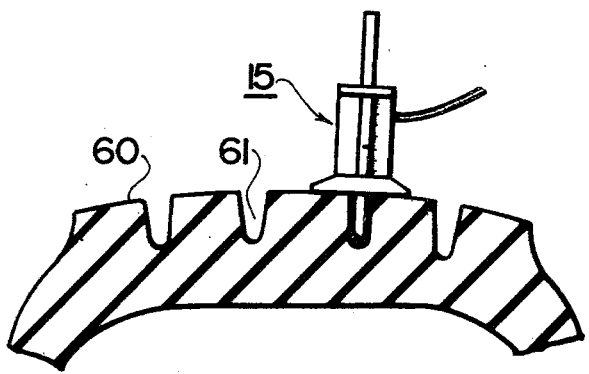
FIG. 4 is a diagrammatical view partly shown in section of an embodiment illustrating the measurement of the depth of the tread groove with the sensor shown in FIG. 3.

In FIG. 4 is shown an embodiment of measuring a depth of a tread groove 61 formed in a tread portion of a tire 60 through the sensor 15 as described above, wherein the tire 60 is partly shown in section. In the practical measurement, the scale 51 is sufficiently pushed downward through the casing 50 and inserted into the tread groove 61. Then, the casing 50 is pushed downward until the lower surface of the base member 52 becomes into contact with the tread surface of the tire 60. In this way, a length of the scale 51 extending from the lower surface of the base member 52 to the top 55 becomes equal to the depth of the tread groove 61 and hence the slide bar 56 or the contact piece of the variable resistor is located at a position corresponding to the depth of the tread groove 61. Since the predetermined voltage is applied to the variable resistor from the power circuit, a potential generated in the contact piece is an analogue voltage value indicating the depth of the tread groove. Of course, the depth of the tread groove may be read by using the standard mark 53 of the scale 51 and the calibration 54 of the casing 50.

As shown in FIG. 2, the analogue voltage corresponding to the depth of the tread groove detected in the sensor 15 is amplified to a proper level by means of the amplifier 44 and then applied to the A-D converter 45 so as to convert into a digital quantity. This digital quantity can indicates the measured value of the depth of the tread groove at an accuracy of 1/10 mm. In order to correctly indicate the actual depth of the tread groove 61 by the digital quantity, the gain regulating knob 32 is regulated to adjust a gain of the amplifier 44. The digital quantity is supplied from the A-D converter 45, to the display section 30. At that time, when the switch 31 is closed to actuate the display section 30, the depth of the tread groove is indicated, for example, as "7.1" MM in the dispaly section.

The calculation and control section 46 comprises a memory part 46A for storing the measured values as the depth of the tread groove from the A-D converter 45, a calculation part 46B for calculating an arithmetic mean value from these measured values, and a control part 46C for controlling operations of the memory part 46A and calculation part 46B as well as the printer 40. Numerical values indicating a body number of a vehicle to be measured, a location of a tire to be measured in the vehicle and points to be measured in the tire or the measuring number are also supplied to the control part 46C of the calculation and control section 46 through the digital switches 33, 34 and 35, respectively. In order to indicate the location of the tire, for instance, the right front wheel, left front wheel, right rear wheel and left rear wheel are previously established as "1", "2", "3" and "4", respectively.

To the control part 46C of the calculation and control section 46 are further connected various external control members, i.e. start pushbutton 36, cancel pushbutton 37, measuring pushbutton 38 and feed pushbutton 39. By pressing the start pushbutton 36, the body number, location number of tire to be measured and measuring number are printed out on a paper by means of the printer 40 and at the same time, the device is made in a measurable state. By pressing the cancel pushbutton 37, only a measured value lastly stored in the memory part 46A of the calculation and control section 46 or a most newly measured value is cleared off. The pressing of the measuring pushbutton 38 acts to store the measured value from the A-D converter 45 in the memory part 46A of the calculation and control section 46. The pressing of the feed pushbutton 39 actuates the printer 40 so as to conduct a paper feeding.

The remote control switch 18 is an ordinary ON-OFF switch and has the same function as the measuring pushbutton 38.

The operation of actual measurement using the above-mentioned measuring device will be described below.

At first, the sensor 15 and remote control switch 18 are connected to the receptacles 17 and 20, respectively. In this case, the power supply socket 21 is not necessarily connected to the receptacle 23 when the battery 42 is in a sufficiently charged state. Next, the digital switches 33, 34 and 35 are handled to preset the body number, location number of tire and measuring number, respectively.

Figure 5:
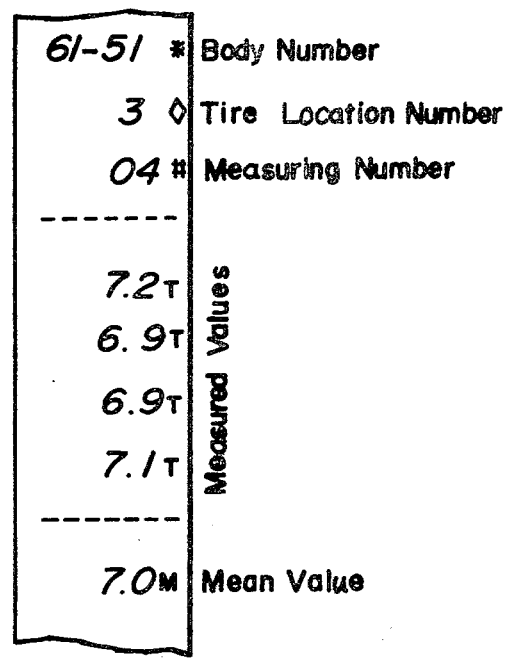
FIG. 5 is a plan view of a part of a paper printed with preset and measured values.

When pressing the start pushbutton 36, the printer 40 is operated through the control part 46C, whereby the body number "61–51*", tire location number "3" and measuring number "04π" are printed out on a paper as shown in FIG. 5.

Then, the depth of the tread groove 61 is measured by using the sensor 15 as explained with respect to FIG. 4. The measured value is visually confirmed from the display section 30 by the closing of the ON-OFF switch 31. Thereafter, the measuring pushbutton 38 or the pushbutton 18a of the remote control switch 18 is pressed. Moreover, when using the remote control switch 18, the operator is apart from the measuring device, so that the depth of the tread groove can be confirmed by reading the calibration of the sensor 15. By pressing such a pushbutton, the measured value is stored at a first memory position in the memory part 46A of the calculation and control section 46 and simultaneously printed out on the paper by the printer 40. In the control part 46C of the calculation and control section 46 are provided a counter and a comparator. Now, the measured number "1" is counted by the counter, while the counted value is compared with the numerical value of measuring number set in the digital switch 35 by the comparator.

Then, the depth of the tread groove is measured at different point of the same tire. The thus measured value is stored at a second memory position in the memory part 46A of the calculation and control section 46 by again pressing the measuring pushbutton 38 or the remote control switch 18 after the visual confirmation of the value, while the measured number "2" is counted by the counter of the control part 46C. In this case, the measured value is also printed out on the paper by the printer 40.

The depth of the tread groove is measured at four points in total with respect to the same tire by pressing the measuring pushbutton 38 or the remote control switch 18 every measurements. The four measured values are stored at each memory position in the memory part 46A, respectively, while the measured number "4" is counted by the counter.

In the course of the measurement, the measured value stored in the memory part 46A may be cleared off by pressing the cancel pushbutton 37. In this case, the counted value is subtracted by 1 through the counter of the control part 46C.

When the actual measured number is coincident with the preset measuring number in the comparator of the control part 46C, the measured values stored in the memory part 46A are read out and supplied to the calculation part 46B of the calculation and control section 46. In the calculation part 46B, an arithmetic mean value is calculated from these values. Thereafter, the calculated mean value is printed out on the paper by the printer 40.

If it is intended to calculate a mean value of the measured values at the actual measured number smaller than the preset measuring number, the start pushbutton 36 is pressed only. In other words, when the start pushbutton 36 is pressed in the course of the measurement, the measured values stored in the memory part 46A up to that time are read out and supplied to the calculation part 46B, where an arithmetic mean value is calculated from the measured values and as a result, the calculated mean value is printed out on a paper by the printer 40.

After the measurement of the depth of the tread groove is completed with respect to one tire, the digital switch 34 is operated to preset the number of next tire location to be measured.

Then, the start pushbutton 36 is pressed to print out the body number, new tire location number and measuring number on a paper.

By repeating the same operation as described above, the depth of the tread groove is measured with respect to one vehicle and the measurement results are printed out on a paper by the printer 40.

By pressing the feed pushbutton 39, a printed paper is fed only at a given length and then cut.

As shown in FIG. 3a, the sensor 15 is provided with the calibration 54 capable of visually reading the depth of the tread groove, but the measured value is indicated on the display section 30 in the measuring device according to the invention, so that there is not always required the provision of the calibration.

Figure 6:
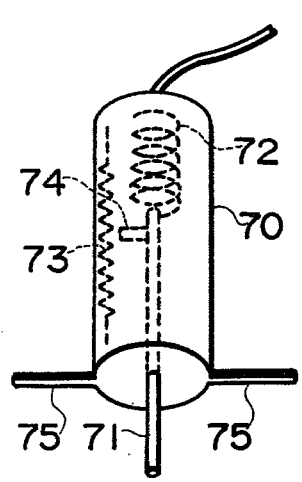
FIGS. 6 and 7 are perspective views of another embodiments of the sensor according to the invention, respectively.

In FIG. 6 is shown another embodiment of the sensor to be used in the invention, wherein the calibration is not provided. This sensor comprises a cylindrical casing 70, a slide bar 71 slidably arranged along a central axis of the casing and a compression coil spring 72 connected to the upper end of the bar for displacing the bar downward at ordinary times. The slide bar 71 is provided with a contact piece 74 for a variable resistor 73. To the lower end of the casing 70 are secured a pair of base rods 75. In the measurement of the depth of the tread groove, the base rods 75 are brought into contact with the tread surface of the tire.

Figure 7:
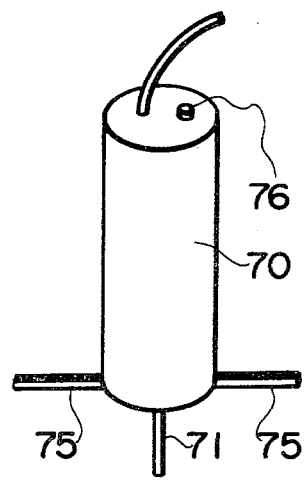

In FIG. 7 is shown a modified embodiment of the sensor shown in FIG. 6. In this embodiment, a pushbutton 76 for remote control switch is assembled in the casing 70 constituting the sensor of FIG. 6. In addition to the pushbutton 76, switches for pushbuttons 36, 37 and 39 may be assembled into the casing 70. The remote control operation using the sensor of FIG. 7 is particularly effective for such a case that it becomes tired of going in and out beneath a body of a large-sized truck or the like.

The invention is not limited only to the embodiments as described above and makes it possible to take many variations and modifications without departing from the scope of the invention.

For instance, digital switches 33, 34 and 35 for presetting the body number, tire location number and measuring number are provided in the above mentioned embodiments, but there are not always required these switches. Further, another switch may be provided for sequentially changing the tire location number without presetting such number. In the latter case, it is necessary to measure the tires mounted on the vehicle in a predetermined order. If such an another switch is a remote control switch, the depth of the tread groove can be measured in a place apart from the body of the measuring device, so that the workability is further improved.

In the above embodiments, the variable resistor is arranged in the sensor, but any other means for converting mechanical displacement into an electrical analogue quantity, such as differential transformer, magnetic scale and the like may be used.

Moreover, the dispaly section 30 is used for visually reading the measured value, but this section 30 may be omitted, if necessary.

In the above embodiments, the arithmetic mean value for the depth of the tread groove is calculated with respect to the vehicle, but another values may also be calculated. Particularly, the calculation and control section may be constructed for calculating distribution of measured value, scattering degree, arithmetic mean value and the like for the depth of the tread groove with respect to a great number of waste tires. Furthermore, by presetting a depth of a tread groove in a new tire and a running distance as external inputs, a distance capable of running within a safety range of the groove depth and a running distance till tire change may be calculated. Such a calculation is very convenient for car users.

What is claimed is:

1. A device for measuring a depth of a tread groove in a tire, comprising: a sensor for measuring the depth of the tread groove formed in a tread portion of a tire as an electrical analogue quantity, an analogue-digital converter for converting said analogue quantity from said sensor into a digital quantity, a calculation and control section for storing a plurality of said digital quantities and making a given calculation against the stored digital quantities in accordance with a command from exterior, an indication section for indicating a result calculated in said calculation and control section, and external preset members electrically connected to the calculation and control section for presetting a body number of a vehicle provided with tires to be measured, a location number of a tire to be measured in said vehicle, and the number of measurements to be made on said tire.

2. A device for measuring a depth of a tread groove in a tire, comprising: a sensor for measuring the depth of the tread groove formed in a tread portion of a tire as an electrical analogue quantity, an analogue-digital converter for converting said analogue quantity from said sensor into a digital quantity, a calculation and control section for storing a plurality of said digital quantities and making a given calculation against the stored digital quantities in accordance with a command from exterior, an indication section for indicating a result calculated in said calculation and control section, a member electrically connected to the calculation and control section for presetting a location of a tire to be measured among a plurality of tires mounted on a vehicle, and a remote control switch for sequentially changing the preset value of said member.

3. A device for measuring a depth of a tread groove in a tire, comprising: a sensor for measuring the depth of the tread groove formed in a tread portion of a tire as an electrical analogue quantity, an analogue-digital converter for converting said analogue quantity from said sensor into a digital quantity, a calculation and control section for storing a plurality of said digital quantities and making a given calculation against the stored digital quantities in accordance with a command from exterior, an indication section for indicating a result calculated in said calculation and control section, a member electrically connected to the calculation and control section for presetting the number of measurements made on each tire, and means in said calculation control section for automatically making a given calculation only after the preset number of measurements has been made.

4. A device as claimed in claims 1, 2 or 3, wherein said sensor comprises a casing provided with a base member at its lower surface, a scale slidably arranged in the front side of said casing, a slide bar arranged parallel to said scale and sliding together therewith, and a variable resistor having a contact piece connected to said slide bar.

5. A device as claimed in claims 1, 2 or 3, wherein said sensor comprises a casing provided with a base member at its lower surface, a slide bar slidably arranged in said casing, a spring for displacing said slide bar downward at ordinary times, and a variable resistor having a contact piece connected to said slide bar.

6. A device as claimed in claims 1, 2 or 3, wherein said device further comprises a display section for displaying a measured value, which is measured by said sensor and supplied from said analogue-digital converter, as a depth of a tread groove.

7. A device as claimed in claims 1, 2 or 3 wherein between said analogue-digital converter and said calculation and control section is arranged a manual operation switch for supplying the measured value from said sensor, after the visual confirmation, to said calculation and control section and storing it therein.

8. A device as claimed in claim 7, wherein said manual operation switch is a remote control switch.

9. A device as claimed in claim 8, wherein said remote control switch is assembled into said sensor.

10. A device as claimed in claims 1, 2 or 3, wherein said indication section comprises a printer for printing out the calculated result in said calculation and control section.

11. A device as claimed in claim 3, wherein said calculation and control section comprises an operational member capable of making a given calculation at the measured number smaller than the preset number.

* * * * *